United States Patent [19]

Suzuki

[11] Patent Number: 4,714,933
[45] Date of Patent: Dec. 22, 1987

[54] LASER PICTURE-DRAWING APPARATUS

[75] Inventor: Akira Suzuki, Numazu, Japan

[73] Assignee: Toshiba Machine Co., Ltd., Tokyo, Japan

[21] Appl. No.: 916,786

[22] Filed: Oct. 8, 1986

[30] Foreign Application Priority Data

Oct. 8, 1985 [JP] Japan .................. 60-224065

[51] Int. Cl.$^4$ .......... G01J 9/42; G03G 15/28; G01J 1/20

[52] U.S. Cl. .................. 346/108; 250/201; 355/8

[58] Field of Search ........ 250/201, 560, 561; 346/108, 160; 355/8, 65, 66; 358/293

[56] References Cited

U.S. PATENT DOCUMENTS

| 3,614,456 | 10/1971 | Hamisch | 346/108 |
| 4,259,004 | 3/1981 | Tateoka et al. | 355/66 |
| 4,274,101 | 6/1981 | Kataoka et al. | 346/108 |
| 4,358,774 | 11/1982 | Wilkinson | 346/108 |
| 4,578,689 | 3/1986 | Spencer et al. | 346/108 X |

Primary Examiner—E. A. Goldberg
Assistant Examiner—Patrick W. Foster
Attorney, Agent, or Firm—Oblon, Fisher, Spivak, McClelland, & Maier

[57] ABSTRACT

A laser picture drawing apparatus comprises a movable stage for supporting a screen having a surface on which a figure is to be drawn, a laser oscillator for emitting a laser beam, a galvanomirror for deflecting the laser beam, a F-$\theta$ for focussing the deflected beam a focal point on the surface to be drawn upon, and a mirror disposed movably along an optical axis between the F-$\theta$ lens and the surface to be drawn upon, for reflecting the beam from the F-$\theta$ lens in a figure-drawing direction. The reflector is moved along the optical axis at a distance equal to the thickness of the screen.

7 Claims, 4 Drawing Figures

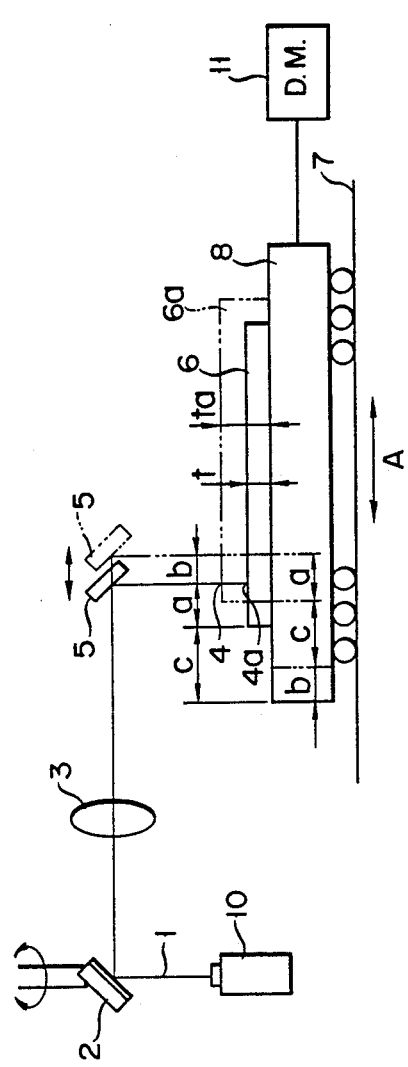
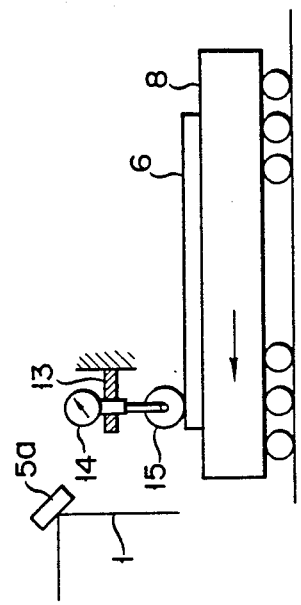

LASER PICTURE-DRAWING APPARATUS

BACKGROUND OF THE INVENTION

The present invention relates to a laser picture-drawing apparatus for drawing a picture on a medium such as a screen, by deflecting a laser beam by use of a deflector and then turning ON and OFF the beam focused, through a focussing lens, on the medium and, more particularly, to a laser picture-drawing apparatus having a function for regulating the focal point position of a laser beam displaced due to a variation in the thickness of a medium.

A conventional laser picture-drawing apparatus will now be described.

A laser beam oscillated from a laser oscillator is deflected (scanned) in a perpendicular direction by deflecting means, and is then focused on the surface of a screen, through a focussing lens.

The beam is bent substantially perpendicularly by a mirror, and then arrives at the screen.

The screen is fastened onto a stage moving on a base, and is moved by a drive mechanism.

Thus, the beam is applied to the upper surface of the screen in accordance with image-forming signals, to thereby draw a picture on the screen.

When the thickness of the screen varies, to thereby cause the focal point position to alter in such a laser picture-drawing apparatus, the focal point position is displaced by varying the position of the lens along the optical axis, and is regulated so that the focal point is matched onto the upper surface of the screen whose thickness, (i.e., height) varies.

According to this device, the deflecting width of the beam on the screen alters due to the variation in the distance between a galvanomirror and the lens. In order to regulate the deflecting width to a predetermined value, it is very complicated to finely alter the deflecting velocity of the galvanomirror.

SUMMARY OF THE INVENTION

An object of the present invention is to provide a laser picture-drawing apparatus which is capable of readily correcting the focal point when the thickness of a medium varies and to correct matters relative to the correction of the focal point.

In order to achieve the above and other objects, there is provided a laser picture-drawing apparatus for drawing a picture on a medium by deflecting a laser beam by use of a deflector, and then turning ON and OFF the beam focused, through a focussing member, on the medium, to regulate the focal point position by refracting the beam passed through the lens in a direction substantially perpendicular to the scanning plane, by use of a mirror, and altering the position of the mirror by an amount proportional to the thickness of the medium.

BRIEF DESCRIPTION OF THE DRAWINGS

FIG. 1 is a view for describing the construction of an embodiment of the present invention;

FIG. 2 is a view showing an apparatus for measuring the thickness of a screen before drawing a picture;

DETAILED DESCRIPTION OF THE PREFERRED EMBODIMENTS

Figure 3:
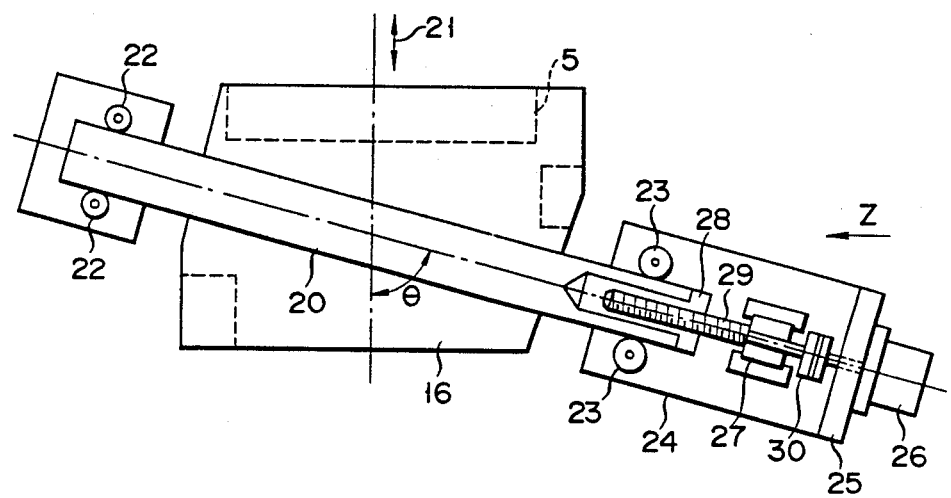
FIG. 3 is a schematic plan view showing a mirror position-regulating device of the essential portion of the embodiment of the invention.

An embodiment of the present invention will now be described in detail with reference to FIGS. 1 to 4.

Laser beam 1 oscillated from laser oscillator 10 is deflected (scanned) in a perpendicular direction by galvanomirror 2 of deflecting means, and is then focused at point 4 (a line when considering the scanning direction) on the surface of a medium such as screen 6, through F-$\theta$ lens 3 or other focussing elements.

Beam 1 is bent substantially perpendicularly by mirror 5, and then arrives at screen 6.

Screen 6 is fastened onto stage 8 moving on base 7, and is moved by ordinary drive mechanism 11, in the direction of arrow A.

Thus, beam 1 is applied to the upper surface of screen 6 in accordance with image-forming signals, to thereby drawing a picture or figure on screen 6.

In the laser picture drawing apparatus as described above, when screen 6 of thickness t is varied to screen 6a of thickness $t_a$, it is necessary to displace the focal point position by $t_a - t$ (=b).

Therefore, when the position of mirror 5 is displaced to position 5a by distance b along an optical axis, the distance between lens 3 and screen 6a is the same as before the thickness alters, to thereby correct the focal point. Since the optical path length does not change at this time, the deflecting width of beam 1 does not vary on screen 6a.

A figure drawn is at distance a from the end of screen 6a fastened on stage 8 and positioned at distance C from the end of stage 8, by the above correction. This figure will be drawn at the distance of a+b from the end of screen 6a when screen 6a is fastened to the same position on stage 8 even if the thickness of screen 6a varies. Since this is, in general, inconvenient, the same figure can be drawn at distance a from the end of screen 6a when screen 6a is positioned at distance c+b, or when the time of transmitting data is changed, thereby to displace stage 8 by distance b from the position which stage 8 assumes when the thickness of screen 6a is t.

Since the position of stage 8 is generally accurately controlled in the apparatus of this type, this alteration can be executed without any difficulty, and the deflecting width does not vary.

The moving distance of mirror 5 in FIG. 2 can be set by inputting the thickness of screen 6a by operating a control switch board, together with the data required to draw a figure at that time, since the thickness is determined when screen 6a (PC board) is decided.

FIG. 2 shows a device for measuring the thickness of screen 6a before drawing. This device measures the thickness $t_a$ of screen 6a by bringing contactor 15 of length measuring unit 14 into contact with the surface of screen 6a before stage 8 arrives at the drawing point under beam 1, and regulates the focal point position and the position of regulating mirror 5a by the measured value. Unit 14 is, for example, a linear scale (e.g., a Magne-scale type) and is attached to stationary arm 13.

Figure 4:
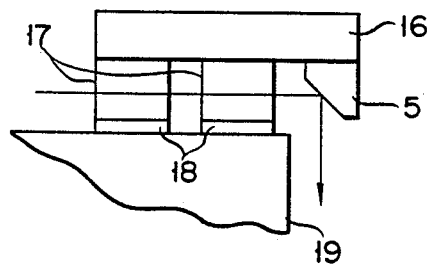
FIG. 4 is a side view as seen from the direction of arrow z of FIG. 3.

FIGS. 3 and 4 show an example of a position-regulating device of mirror 5. Base 16, for mounting mirror 5 can slide on surface plate 19 by means of slider 18 mounted through legs 17.

Stationary bar 20 is mounted on base 16, obliquely at $\theta$ with respect to focal point position-regulating direction 21, is interposed at one end between two rollers 22 capable of fastening onto plate 19, and at the other end between rollers 23 provided rotatably on base 24. Rollers 22, 23 support bar 30 such that bar 30 can move in the axial direction but cannot rotate. Pulse motor 26 is fastened to projection 25 partially formed on base 24, and the outer race of bearing 27 is fastened to plate 19 in a stationary state.

A ball nut 28 is clamped to the other end face of bar 20, a ball screw 29 threaded with nut 28 is supported to the inner race of bearing 27, and is coupled, through coupling 30, with motor 26.

When motor 26 is rotated by a signal from the control board, screw 29 rotates to move bar 30 by distance l. Then mirror 5 moves a distance of l cos $\theta$ in the focal point position-regulating direction.

When $\theta$ is selected to approx. 60° to 88°, an entire drive system, disposed longitudinally with respect to a slender mirror, can be constructed compactly, and the moving distance in the focal point position-moving direction is short. Thus, movement of high accuracy of several microns can be performed by motor 26.

As is described above, the present invention provides a laser picture-drawing apparatus for drawing a picture on a screen by deflecting a laser beam by use of a deflector, and then turning ON and OFF the beam focused, through an F-$\theta$ lens, on the screen, to regulate the focal point position by refracting the beam passed through the lens in a direction substantially perpendicular to the scanning plane, by use of a mirror and altering the position of the mirror by an amount proportional to the thickness of the screen. Therefore, the invention can readily correct the focal point when the thickness of a screen varies and can correct matters relative to the correction of the focal point.

What is claimed is:

1. A laser picture-drawing apparatus comprising:
    support means for supporting a medium having a surface on which a figure is to be drawn,
    a light source for emitting a laser beam,
    means for deflecting the laser beam,
    focussing means for focussing the deflected beam as a focal point on the surface to be drawn,
    reflecting means disposed movably along an optical axis between said focussing means and the surface to be drawn, for reflecting the beam from said focussing means in a figure-drawing direction,
    drive means for moving said reflecting means along the optical axis at a distance according to the thickness of the medium.

2. An apparatus according to claim 1, which further comprises means for measuring the thickness of the medium, to drive said drive means in accordance with the measured value.

3. An apparatus according to claim 2, wherein said support means comprises a stage for displacing the medium at a distance equal to the moving distance of said reflecting means.

4. An apparatus according to claim 3, wherein said support means comprises a base, and said stage is moved at a distance according to the thickness of the medium, and a picture is drawn on the base.

5. An apparatus according to claim 1, wherein said drive means supports said reflecting means, and comprises a base, which is moved in a direction inclined at a predetermined angle with respect to the optical axis, and a drive mechanism for moving the base.

6. An apparatus according to claim 5, wherein said drive mechanism moves the base in a direction inclined at 60 to 88 degrees to the optical axis.

7. An apparatus according to claim 6, wherein said drive mechanism comprises a bar mounted on the base and inclined at an angle of 60 to 88 degrees to the optical axis, and a drive source for longitudinally driving the base in the length according to the thickness of the screen.

* * * * *